United States Patent
Laude

[11] Patent Number: 6,160,933
[45] Date of Patent: Dec. 12, 2000

[54] OPTICAL FIBER WAVELENGTH MULTIPLEXER-DEMULTIPLEXER

[75] Inventor: Jean-Pierre Laude, St-Cyr-la-Rivière par Saclas, France

[73] Assignee: Instruments S.A., Paris, France

[21] Appl. No.: 09/100,242

[22] Filed: Jun. 19, 1998

[30] Foreign Application Priority Data

Jun. 25, 1997 [FR] France ................................ 97 07952

[51] Int. Cl.[7] ............................................ G02B 6/32
[52] U.S. Cl. ............................................ 385/31
[58] Field of Search ............... 385/24, 31–36, 385/39, 147

[56] References Cited

U.S. PATENT DOCUMENTS 4,198,117   4/1980   Kobayashi .................... 385/37
4,622,662  11/1986   Laude et al. .................. 370/3

FOREIGN PATENT DOCUMENTS 0 112 234   6/1984   European Pat. Off. .
38 43 970   7/1990   Germany .

OTHER PUBLICATIONS

Y. Fujii et al: "Optical Demultiplexer Utilizing an Ebert Mounting Silicon Grating", Journal of Lighwave Technology, vol. 2, No. 5, Oct., 1984, New York, U.S., pp. 731–734.

M. Shirasaki et al: "Broadining of Bandwidths in Grating Multiplexer by Original Dispersion Dividing Prism", Electronics Letters, vol. 22, No. 14, Jul. 3, 1986, Enage, GB, pp. 764–765.

*Primary Examiner*—Akm E. Ullah
*Attorney, Agent, or Firm*—Arent Fox Kintner Plotkin & Kahn, PLLC

[57] ABSTRACT

An optic fiber wavelength multiplexer-demultiplexer comprising a dispersing system (1) exhibiting a dispersing plane, at least one input fiber (2) with an output face, at least one output fiber (3) with an input face, and a device (4) for optic matching of the output face of the input fiber with the input face of the output fiber. The dispersing system and the matching means form an optic system with multiple transversal focuses (6) in the dispersing plane.

11 Claims, 3 Drawing Sheets

PRIOR ART

OPTICAL FIBER WAVELENGTH MULTIPLEXER-DEMULTIPLEXER

BACKGROUND OF THE INVENTION

This invention relates to an optic fiber wavelength multiplexer-demultiplexer or router, liable to be used as a component in optic fiber teletransmission units.

Such multiplexers-demultiplexers are already known, as described, then gradually perfected, in particular in the French patents FR-2.543.768, FR-2.519.148, FR-2 479.981, FR-2.496.260 and in the European patent EP-0.196.963.

By optic fiber multiplexer-demultiplexer, we mean devices in which input and output luminous waves are propagated by optic fibers.

The invention also relates to the optic fiber routers in which a variable number of input flows, each with a particular wavelength, propagated by spatially distinct optic fibers, are addressed on a possibly different number of output fibers.

In these different devices, coupling is made via a dispersing system, for a given wavelength between an output fiber and an input fiber.

Thus is defined a channel which exhibits of course a certain spectral width $\Delta\lambda$.

Powerful multiplexers-demultiplexers or routers must simultaneously enable operating a vast number of channels, each of these channels, centered round a wavelength $\lambda$, must exhibit a spectral width $\Delta\lambda$ which is as large as possible, while avoiding any crosstalk.

There is a crosstalk when a portion of the energy from a channel is partially mixed with the energy from an adjacent channel. It is well known that the crosstalk disturbs the communications and that the devices exhibiting an excessive rate of crosstalk are useless in practice.

In order to simplify the description, the device according to the invention will be qualified as a multiplexer-demultiplexer, whereas it should be noted that it may relate to a multiplexer, a demultiplexer or a router.

OBJECTS AND SUMMARY OF THE INVENTION

The purpose of the invention is therefore to provide a multiplexer-demultiplexer offering improved capabilities and, while maintaining good separation of the channels, improving the spectral width of each of them.

In order to meet this target, it has been suggested, according to the invention, to implement optic means ensuring the matching of the output face of the input fiber with the input face of the output fiber, which constitute a double focus optic system.

Thus, the wavelength transmission function between an input fiber and an output fiber of the multiplexer is ensured by the superimposition of the transmission functions produced by the optic system, respectively for each of its focuses.

The spatial offset of the focuses produces a spectral offset of the elementary transfer functions and thus enables to widen the overall transfer function.

The invention therefore relates to an optic fiber wavelength multiplexer-demultiplexer comprising a dispersing system exhibiting a dispersing plane, at least one input fiber with an output face, at least one output fiber with an input face, means for optic matching of the output face of the input fiber with the input face of the output fiber.

According to the invention, the dispersing system and the matching means form an optic system with multiple transversal focuses in the dispersing plane.

A double focus optic system means here any optic system which generates a transversally split image of a same point object, regardless whether it is located at a finite or infinite distance. A system with multiple transversal focuses generates several images of the same point object; it can form a continuous sequence of images.

According to different embodiments each exhibiting their particular advantages and liable to be implemented in all their technically possible combinations:

- the device comprises a partial mirror placed in front of a complete mirror assembly,
- the partial mirror is a skylight mirror,
- the partial mirror is semi-reflecting,
- the partial mirror and the complete mirror are spherical mirrors, with the same focus, offset with respect to one another, transversally in relation to their optic axes,
- the partial mirror and the complete mirror are spherical mirrors, with the same focus, whereas the optic axis of one of them forms a small angle $\alpha$ with the optic axis of the other,
- the device comprises an optic element with multiple transversal focuses co-operating in transmission,
- this optic element is a lens with multiple transversal focuses,
- this optic element is semi-prismatic,
- it comprises a multiple step network,
- it comprises a variable step network.

BRIEF DESCRIPTION OF THE DRAWINGS

The invention will be described more in detail with reference to the appended drawings in which.

DETAILED DESCRIPTION OF PREFERRED EMBODIMENTS

The figures represent the optic components of the device of the invention, independently from the mechanic structures which carry them and ensure their respective positions. These mechanic structures may take on numerous shapes and are accessible to the man of the art.

This description is made with reference to the use of optic fibers as input and output means of the multiplexer-demultiplexer. It is still well-known that there are emitting components (diodes or diode bars) and receiving components (CCD or CCD bars) whose active elements are small in size, of the same order of magnitude as the fiber cores, ranging between a few microns and a few dozen microns, and regularly spaced, whose characteristics make them compatible with the fibers. In certain applications, such components can replace the input or output fibers of the multiplexer-demultiplexer of the invention and be located instead of the ends of the said fibers directly at the spectral focus. Such components are therefore equivalent to the fibers in the definition of the invention.

The description hereafter makes reference to a multiplexer-demultiplexer. It is also possible to implement the invention to build a router.

Figure 1:
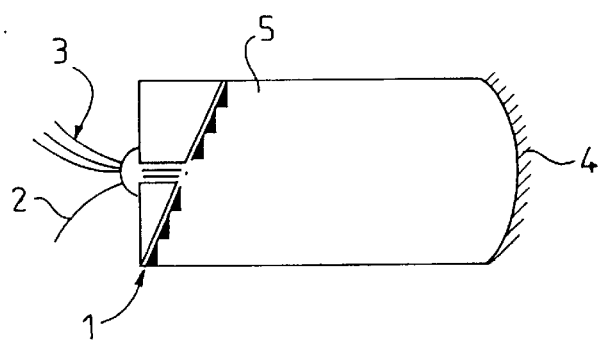
FIG. 1 is a multiplexer-demultiplexer of the previous art.

The multiplexer-demultiplexer represented on FIG. 1 comprises a dispersing system consisting of a network 1, an input fiber 2 supplying the device with a multiplexed luminous flow and a output fiber comb 3 supplying flows which are differentiated for each wavelength. The ends of these fibers 3 are placed in the center of the network 1, itself approximately at the focus of a reflecting optic system 4. The space 5 situated between the network 1 and the mirror 4 can accommodate various optic components enabling, according to the requirements, to improve the properties of the system. The network 1 can be holographic or engraved.

Figure 2:
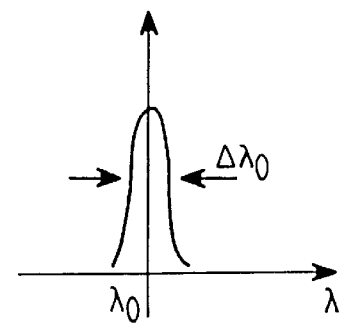
FIG. 2 is the elementary transfer function, for a couple of input-output fibers of the device of FIG. 1.

For such a system, the elementary transfer function defining the wavelength passband for an input fiber-output fiber couple has the form represented on FIG. 2. It is centered on the wavelength $\lambda_0$ and its width at mid-height is $\Delta\lambda_0$. This width at mid-height depends on the set of geometric and optic characteristics of the device.

Figure 3:
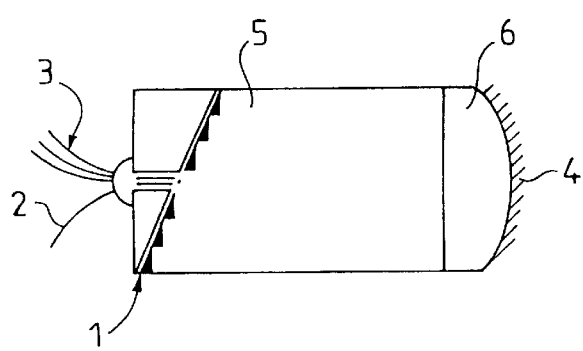
FIG. 3 is a multiplexer-demultiplexer according to the invention.

FIG. 3 represents a multiplexer-demultiplexer according to the invention whose elements analogous to those of FIG. 1 have been indicated by the same numeric references. The optic system 6 is a system with multiple transversal focuses, here double focus, i.e. the luminous flow emitted by one of the input fibers, instead of converging at a single point as is the case for a conventional, single focus, optic system, converges at two points, respectively $f_1$ and $f_2$.

Figure 4:
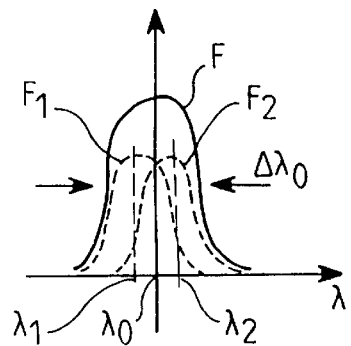
FIG. 4 is a representation of the transfer function of the device of FIG. 3.

The elementary transfer function F of such a system is the addition of the transfer function $F_1$ obtained for the portion of the optic system converging at the point $f_1$ and of the transfer function $F_2$ obtained for the portion of the flow converging at the point $f_2$. The resulting transfer function is then the curve F represented on FIG. 4.

The gap between the central wavelength $\lambda_1$ of the transfer function $F_1$ and $\lambda_2$ of the transfer function $F_2$ depends on the distance between the focuses $f_1$ and $f_2$ and the resulting transfer function, corresponding to the multiplexer-demultiplexer devices taken as a whole, is the transfer function F.

An angle $\alpha$ between the axes $a_1$, $a_2$ joining the apexes of the mirrors (approximately superimposed) and the focuses $f_1$ and $f_2$ produces a gap $$\lambda_1 - \lambda_2 \approx 4\alpha n (d \cos \beta)/k$$

where d is the step of the network and k the order of the network used, n is the index of the diffraction medium, $\beta$ is the angle of the normal to the network and the direction of the incident radii and diffracted in Littrow condition (in which the incidence and diffraction angles are approximately equal).

The widths at mid-height $\Delta\lambda_1$ and $\Delta\lambda_2$ are approximately equal to the width at mid-height $\Delta\lambda_0$ obtained for a single focus system, whereas the global transfer function F has, for its own part, a width $\Delta\lambda$ vastly superior to that width $\Delta\lambda_0$.

Figure 5A:
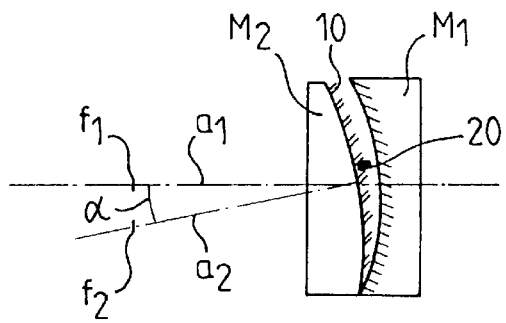
FIGS. 5A and 5B are a first example of double focus optic system that can be used in the device of the invention implementing two mirrors with same focus and different orientations, according to a front view and to a view from above.
Figure 5C:
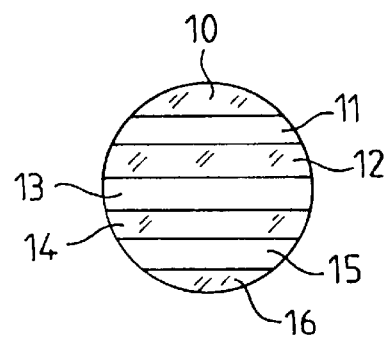
FIG. 5C is a side view representing a partial mirror, with skylight.
Figure 5B:
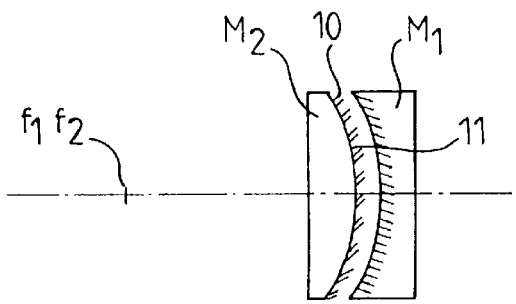

The FIGS. 5A, 5B and 5C represent a first embodiment of a double focus system, which comprises a skylight spherical mirror $M_2$ and a spherical mirror $M_1$, whereby these mirrors have the same focus.

By skylight mirror, we mean a mirror carried by a spherical surface whereas only parallel bands 10 are metallised, leaving between themselves non-metallised bands 11.

The metallised bands 10 reflect the portion of the incident luminous flow that they receive, whereas the non-metallised bands 11 transmit the said luminous flow.

Such a mirror, as represented on FIG. 5C, can be made while protecting the zones 11, 13, 15 designed for transmitting during the metallisation operation of the reflecting zones 10, 12, 14, 16.

Such a partial mirror can also be produced by covering the whole surface of an optic component with a stack of semi-reflecting coats.

The mirror $M_1$, so-called complete mirror, is theoretically a conventional mirror, completely metallised, since it is the most readily available component and because it proves satisfactory.

The mirror $M_1$ must receive the incident luminous flow, non intercepted by the skylight mirror $M_2$. It may also be a second skylight mirror whose reflecting zones are complimentary to the reflecting zones of the first skylight mirror $M_2$.

The mirrors $M_1$, $M_2$ can be stuck together, whereas the space 20 between them is filled with optic glue.

Figure 6A:
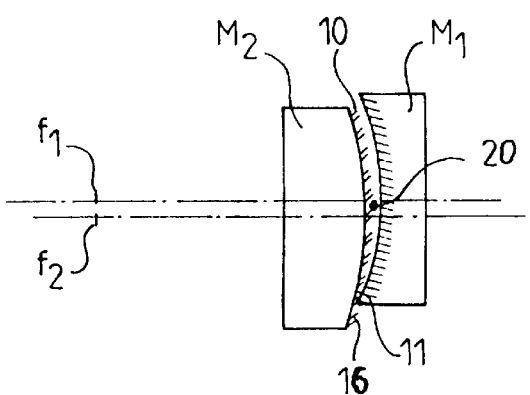
FIGS. 6A and 6B are an example implementing two mirrors of same focus, transversally offset, a second example of double focus optic system that can be used in the device of the invention, according to a front view and to a view from above.
Figure 6B:
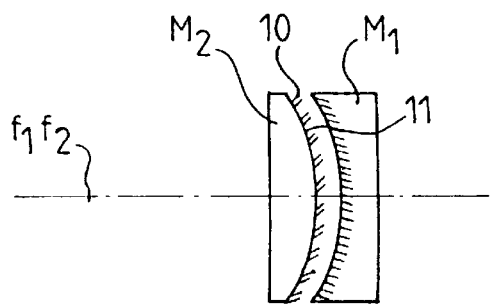

The FIG. 6 and following contain the same notations as those of FIG. 5 to designate the elements of the same nature.

In the embodiment of FIG. 6, the partial mirror $M_2$ is offset transversally with respect to the mirror $M_1$. Both these mirrors have the same focus.

Figure 7:
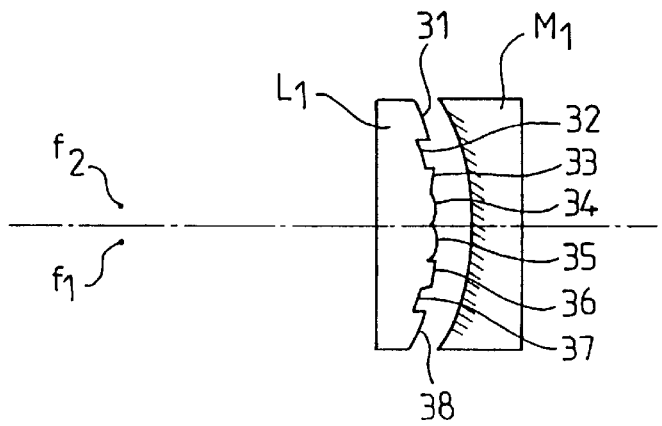
FIG. 7 implementing a bifocal lens is a third example of double focus optic system that can be used in the device of the invention.

In the embodiment of FIG. 7, the beam is intercepted by a resulting bifocal lens $L_2$ thus exhibiting two focuses, respectively $f_1$ and $f_2$, offset longitudinally in relation to one another.

This bifocal lens consists alternately in the transversal direction, of zones made of two identical lenses offset transversally, in relation to one another. We can thus obtain elements of two different natures distributed in the diaphragm, the ones acting onto the luminous flow to cause it at converge to $f_1$, the others to cause it to converge at $f_2$. These elements are advantageously bands 31, 38.

Figure 8:
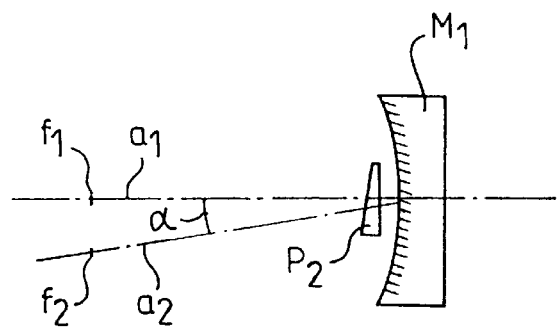
FIG. 8 implementing a prism acting on a portion of the beam is a fourth example of double focus optic system that can be used in the device of the invention.

Finally, in the embodiment of FIG. 8, a small prism $p_2$ is placed in front of the mirror $M_1$ and intercepts a portion of the incident beam.

The bifocal system then has two focuses, respectively $f_1$ and $f_2$, offset transversally, whereas the corresponding axes $a_1$ and $a_2$ form a small angle $\alpha$.

Figure 9:
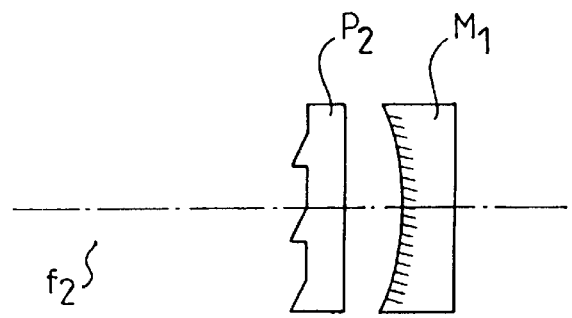
FIG. 9 implementing a prism system distributed inside the diaphragm.

The result can be improved, according to FIG. 9, when parallel prismatic elements are distributed over the surface of the diaphragm and alternate with elements forming parallel-faced blades.

Figure 10:
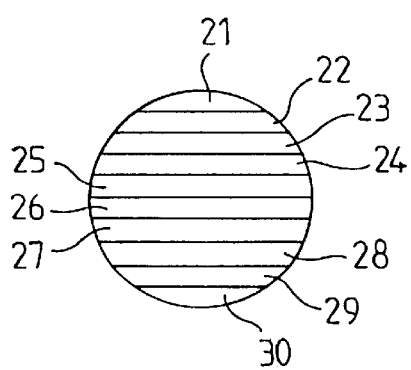
FIG. 10 is a schematic representation of a multiple step network.

A bifocal system, such as represented on FIG. 10, can also be made, while implementing a multiple step network, consisting of an alternating succession of two types of zones, the former 21, 23, 25, 27, 29 exhibiting step $p_1$ lines, the latter step $p_2$ lines.

Thus, the luminous flow received by the network is divided into two dispersing flows according to different angles, preferably very slightly different, forming a transversal double focus system.

While implementing a variable step network, we can obtain a focus extending continuously in the transversal direction.

Moreover, it is advantageous, in the case of a skylight mirror, that the transversal offset $f_1 f_2$ follows the direction parallel to the slots.

What is claimed is:

1. An optic fiber wavelength multiplexer-demultiplexer comprising a dispersing system (1) exhibiting a dispersing plane, at least one input fiber (2) with an output face, at least one output fiber (3) with an input face, means (4) for optic matching of the output face of the input fiber with the input face of the output fiber, characterized in that the dispersing system and the matching means form an optic system with multiple transversal focuses (6) in the dispersing plane.

2. An optic fiber wavelength multiplexer-demultiplexer according to claim 1, characterized in that it comprises a partial mirror ($M_2$) placed in front of a complete mirror ($M_1$).

3. A multiplexer-demultiplexer according to claim 2, characterized in that the partial mirror ($M_2$) is a skylight mirror.

4. A multiplexer-demultiplexer according to claim 2, characterized in that the partial mirror ($M_2$) is a partially reflecting mirror, uniformly over its whole surface.

5. A multiplexer-demultiplexer according to any of the claims 2 to 4, characterized in that the partial mirror ($M_2$) and the complete mirror ($M_1$) are spherical mirrors, of the same focus, offset in relation to one another, transversally with respect to their optic axes.

6. A multiplexer-demultiplexer according to any of the claims 2 to 4, characterized in that the partial mirror ($M_2$) and the complete mirror ($M_1$) are spherical mirrors, of the same focus, whereas the optic axis of one of them forms a small angle $\alpha$ with the optic axis of the other.

7. A multiplexer-demultiplexer according to claim 1, characterized in that it comprises an optic element with multiple transversal focuses co-operating in transmission.

8. A multiplexer-demultiplexer according to claim 7, characterized in that this optic element is a lens (4) with multiple transversal focuses.

9. A multiplexer-demultiplexer according to claim 7, characterized in that this optic element is semi-prismatic ($p_1$).

10. A multiplexer-demultiplexer according to claim 1, characterized in that it comprises a multiple step network.

11. A multiplexer-demultiplexer according to claim 1, characterized in that it comprises a variable step network.

* * * * *

UNITED STATES PATENT AND TRADEMARK OFFICE
CERTIFICATE OF CORRECTION

PATENT NO. : 6,160,933
DATED : December 12, 2000
INVENTOR(S) : Jean-Pierre Laude It is certified that error appears in the above-identified patent and that said Letters Patent is hereby corrected as shown below:

Column 2,
Line 31, change "step network" to -- pitch grating --; and
Line 32, change "step network" to -- pitch grating --;
Line 67, change "step network" to -- pitch grating --;

Column 4,
Line 67, change "step network" to -- pitch grating --;

Column 6,
Line 26, change "step network" to -- pitch grating --; and
Line 28, change "step network" to -- pitch grating --.

Signed and Sealed this

Ninth Day of July, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,160,933                                        Page 1 of 1
DATED         : December 12, 2000
INVENTOR(S)   : Jean-Pierre Laude It is certified that error appears in the above-identified patent and that said Letters Patent is hereby corrected as shown below:

Column 5,
Line 8, change "step network" to -- pitch grating --.

Signed and Sealed this

Fifteenth Day of April, 2003

JAMES E. ROGAN
*Director of the United States Patent and Trademark Office*